(12) United States Patent
Hartlef

(10) Patent No.: US 7,394,963 B2
(45) Date of Patent: Jul. 1, 2008

(54) HOLDER FOR OPTICAL FIBRES

(75) Inventor: Matthias Hartlef, Stade (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 11/780,657

(22) Filed: Jul. 20, 2007

(65) Prior Publication Data

US 2008/0025685 A1 Jan. 31, 2008

(51) Int. Cl.
G02B 6/00 (2006.01)

(52) U.S. Cl. .................. 385/136; 385/134; 385/137

(58) Field of Classification Search ................. 385/136, 385/137
See application file for complete search history.

(56) References Cited

U.S. PATENT DOCUMENTS

| 4,627,686 | A | * | 12/1986 | Szentesi | 385/135 |
| 5,115,260 | A | * | 5/1992 | Hayward et al. | 385/100 |
| 5,135,590 | A | * | 8/1992 | Basavanhally et al. | 156/64 |
| 5,146,532 | A | * | 9/1992 | Hodge | 385/136 |
| 5,222,184 | A | * | 6/1993 | Foss | 385/135 |
| 5,515,472 | A | * | 5/1996 | Mullaney et al. | 385/135 |
| 5,530,786 | A | * | 6/1996 | Radliff et al. | 385/136 |
| 5,566,248 | A | * | 10/1996 | Ulrich | 382/187 |
| 5,566,269 | A | * | 10/1996 | Eberle et al. | 385/137 |
| 5,692,089 | A | * | 11/1997 | Sellers | 385/137 |
| 5,805,758 | A | * | 9/1998 | Kim | 385/137 |
| 5,995,700 | A | | 11/1999 | Burek et al. | |
| 6,195,496 | B1 | * | 2/2001 | Daoud | 385/137 |
| 6,226,439 | B1 | * | 5/2001 | Daoud | 385/137 |
| 6,240,236 | B1 | * | 5/2001 | Daoud | 385/137 |
| 6,249,635 | B1 | * | 6/2001 | Daoud | 385/137 |
| 6,249,636 | B1 | * | 6/2001 | Daoud | 385/137 |
| 6,259,851 | B1 | * | 7/2001 | Daoud | 385/135 |
| 6,285,815 | B1 | * | 9/2001 | Daoud | 385/137 |
| 6,298,191 | B1 | * | 10/2001 | Daoud | 385/137 |
| 6,353,697 | B1 | * | 3/2002 | Daoud | 385/136 |
| 6,360,051 | B1 | * | 3/2002 | Daoud | 385/137 |
| 6,456,772 | B1 | * | 9/2002 | Daoud | 385/135 |
| 6,483,986 | B1 | * | 11/2002 | Krapf | 386/68 |
| 6,567,601 | B2 | * | 5/2003 | Daoud et al. | 385/135 |
| 6,580,867 | B2 | * | 6/2003 | Galaj et al. | 385/137 |
| 6,701,056 | B2 | * | 3/2004 | Burek et al. | 385/137 |
| 6,801,704 | B1 | * | 10/2004 | Daoud et al. | 385/136 |

(Continued)

FOREIGN PATENT DOCUMENTS

DE   28 21 877 C2   2/1981

(Continued)

*Primary Examiner*—Frank G Font
*Assistant Examiner*—Ryan Lepisto
(74) *Attorney, Agent, or Firm*—Perman & Green, LLP

(57) ABSTRACT

A holder for multiple optical fibres, in which a detachable connection is created between the holder and the optical fibres by elastic engagement in a seating The holder includes a comb element with a receiving side facing the optical fibres and a base surface facing the cabin structural part. The comb element has an elongated shape and seatings arranged on the receiving side and extending transversely to the longitudinal direction. The seatings are separated from by fins, and the base surface is partly covered with double-sided adhesive strips. A cavity is formed between the base surface 7 and the cabin structural part for injecting a curable adhesive. Adhesive connections between the holder and the cabin structural part combine the immediate loading capability of a pressure-sensitive bond with the ageing resistance of a reactive adhesive.

6 Claims, 2 Drawing Sheets

U.S. PATENT DOCUMENTS

Figure 1:
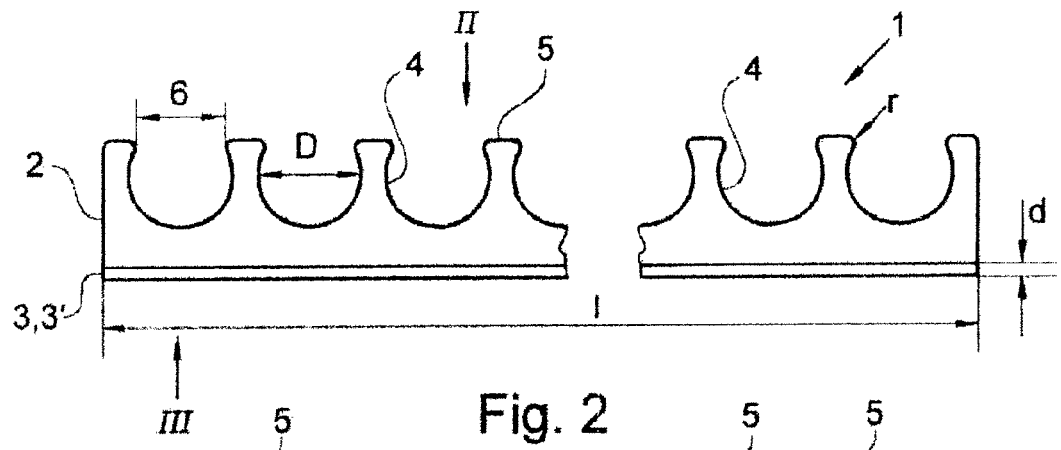

| | | | |
|---|---|---|---|
| 6,810,195 B2 * | 10/2004 | Bhagavatula et al. | 385/137 |
| 6,853,796 B2 * | 2/2005 | Vastmans et al. | 385/136 |
| 7,139,462 B1 * | 11/2006 | Richtman | 385/137 |
| 7,272,291 B2 * | 9/2007 | Bayazit et al. | 385/135 |
| 2002/0006262 A1 * | 1/2002 | Galaj et al. | 385/137 |
| 2002/0048446 A1 * | 4/2002 | Masghati et al. | 385/137 |
| 2004/0071431 A1 * | 4/2004 | Trouchet et al. | 385/137 |
| 2004/0086254 A1 * | 5/2004 | Vastmans et al. | 385/136 |
| 2004/0120682 A1 * | 6/2004 | Bhagavatula et al. | 385/137 |

FOREIGN PATENT DOCUMENTS

| | | |
|---|---|---|
| DE | 31 36 738 C2 | 5/1990 |
| EP | 0 837 346 A1 | 4/1998 |
| JP | 8 306128 | 11/1996 |

* cited by examiner

HOLDER FOR OPTICAL FIBRES

The disclosed embodiments relate to a holder for optical fibres, particularly for cabin structural parts in an aircraft. Optical fibres are used for example to transmit digital light signals for control purposes, or to transmit light energy for optical effects. For example, a starry sky can be reproduced in an aircraft passenger cabin by connecting light outlets distributed in the cabin ceiling to a central light source via a plurality of optical fibres. In order to route these optical fibres, holders with a low installation footprint and which guarantee a detachable connection between the holder and the optical fibre are required. At the same time, the strength and weight characteristics of the cabin structural parts in question must also be borne in mind. This means that drillholes as well as screws and threaded inserts are to be avoided. The differences between routing optical fibres, that is to say optical waveguides, and electrical cables are minor. It is therefore conceivable that known solutions from the latter technical discipline may be applicable in this case as well, provided they satisfy the prevailing conditions thereof.

For example, a holder for routing electrical cables is known from German Patent No. DE 28 21 877 C2. This document relates to a fixing element that may be anchored from the front of a plate-like assembly part in a drillhole therein by means of a longitudinally segmented shaft consisting of a part that is to be inserted first in the drillhole and expands behind the borehole, and a prismatic part that is to be inserted afterwards, wherein each of the two parts contributes to the formation of the circumference of the shaft that cooperates with the drillhole, and wherein the shaft parts are made from an elastic material that has springy properties when deformed, and the separation surface on the flared shaft part deviates increasingly from the mid-line in the direction away from the head part, so that the shaft part becomes progressively thicker in the direction away from the associated head part. The disadvantage associated with this fastening element, known to those skilled in the art as a wedge base, is that drillholes must be created in the plate-like assembly parts to enable it to be used. Since this impairs the strength of the assembly parts, this solution is not suitable for routing optical fibres on the cabin structural parts described.

Another document, Japanese Patent No. 08306128, Abstract Publication No. 10149712 A, describes a solution derived from the field of routing optical fibres. This describes a panel light system in which the object is achieved by a very thin system design. This object is achieved by routing the optical fibres in grooves that are created in the panel, and the light emerging from the end surface of each optical fibre is reflected at a right angle via a mirror of a light emitting device, and the reflected light is directed through drillholes located in the panel, thereby enabling a thinner construction of the panel light system. Since the light reflected by each mirror is collected and emitted by a projection lens located in the light emitting device, it is able to concentrated on a single, localised point to be illuminated. The panel light system is completed with a light source that is located on the panel.

The essential principle of this solution is that grooves are created in the assembly part that is to support the optical fibres. The features described in this solution are not suitable for application to the present case, because the grooves would compromise the strength of the cabin structural part concerned in the same way as the drillholes described previously.

Detachable connections between cables, pipes, tools and the like, and a frame, wall or similar are generally known and usually have the form of an elastic engagement in a seating. one known method for connecting parts without drillholes for wedge bases or screws or other methods that weaken materials is adhesion. In this regard, several options are conceivable. For example, two-component adhesives (reactive adhesives), contact adhesives or pressure-sensitive adhesives may be considered. It should be noted that the adhesive connections between the holders and the cabin structural parts must satisfy extremely stringent requirements in terms of strength and resistance to ageing. Two-component adhesives, for example those based on epoxy resin, satisfy these requirements. In this context, the parts concerned must be affixed precisely during the curing process. It is true that this adhesive takes a long time to cure, but it provides best results with regard to strength and resistance to ageing. When contact adhesives are used, a layer of adhesive is applied to both parts that are to be bonded, and they are brought into contact under pressure after a drying time of a few minutes. The disadvantage associated with this method is that resistance to ageing is limited. Pressure-sensitive adhesives are used primarily in conjunction with adhesive films or adhesive strips. The advantage of these is that the adhesive bonds they create are capable of sustaining load immediately. However, their disadvantage is that the pressure-sensitive adhesive never completely cures and tends to run under continuous loading.

A plug-in module with a splice holder or holder for the ends of communication system cables with coupling means for external coupling of cables to the ends of internal cables located inside the plug-in module by means of detachable connecting elements is known from European Patent No. EP 0 837 346 A1. The coupling means include a holding device for internal plugs, each of which is connected to one end of an internal cable in such manner that a coupling element may be assembled on an internal plug subsequently.

German Patent No. DE 31 36 738 C2 describes a device particularly for routing and retaining optical fibres that pass into and out of the device in the bundle, wherein a separating device with slot-like seatings is provided at the device entry and exit, between which seatings the optical fibres are guided singly or in pairs in the device entry to a connection point separately via a reserve winding, and are guided out of the device again via a reserve winding and a device for reconstituting the bundle. Each separating device is constructed as a comb element, and the fibres pass between the teeth of these comb elements, wherein the free ends of the comb teeth are furnished with recesses arranged perpendicularly to the direction of feed of the optical fibres to accommodate at least one locking element.

A melting splice holder that increases the capacity of a splice closure which has support members thereon for supporting the assembly is known from U.S. Pat. No. 5,995,700 A. The assembly includes a splice tray for pinch connecting to a support member, the member having locating slots to contain two splice holder inserts. A cover member has latching legs that latch to wedge-shaped latches on the splice tray. The cover member is adapted for pivotally mounting a discrete splice tray on the top surface thereof so that the total splice capacity of the splice tray assembly is increased.

Accordingly, it would be advantageous to provide the flattest possible holder for optical fibres, particularly for cabin structural parts in an aircraft, wherein the connection between the holder and the optical fibre is detachable and fixing the holder to the cabin structural part does not involve any measures that reduce the strength of the structural part, and has high resistance to ageing, and wherein the holder is able to support loading immediately despite the use of a relatively slowly curing adhesive.

This task is solved for a holder for optical fibres, particularly for cabin structural parts in an aircraft, wherein a detachable connection between the holder and the optical fibres is formed by elastic engagement in a seating, in that the holder includes a comb element with a retaining side facing the optical fibres and a base surface facing the cabin structural part, and the comb element has an elongated shape with a plurality of seatings on the receiving side and extending transversely to the longitudinal direction thereof, which seatings are separated from each other by fins, and the base surface is partially covered with two-sided adhesive tapes of thickness d that form the connection with the cabin structural part in such manner that a cavity having thickness d is formed between the base surface and the cabin structural part for injecting a curable adhesive.

The disclosed embodiments are represented in the drawing and is explained in greater detail with reference to the description.

IN THE DRAWING

Figure 2:
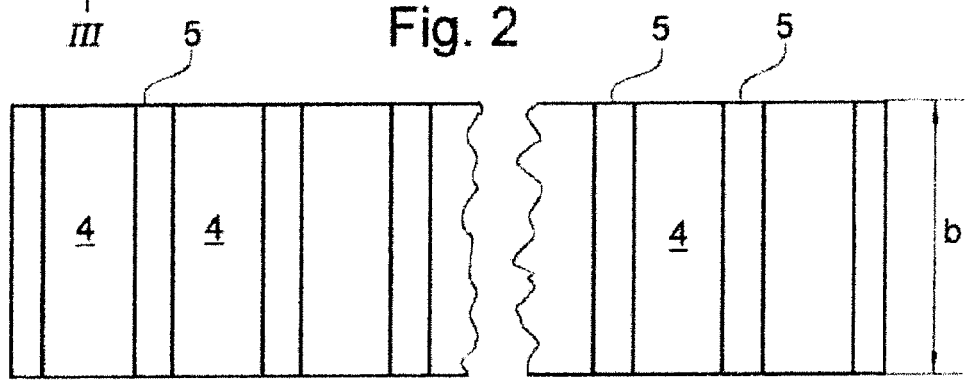
Figure 3:
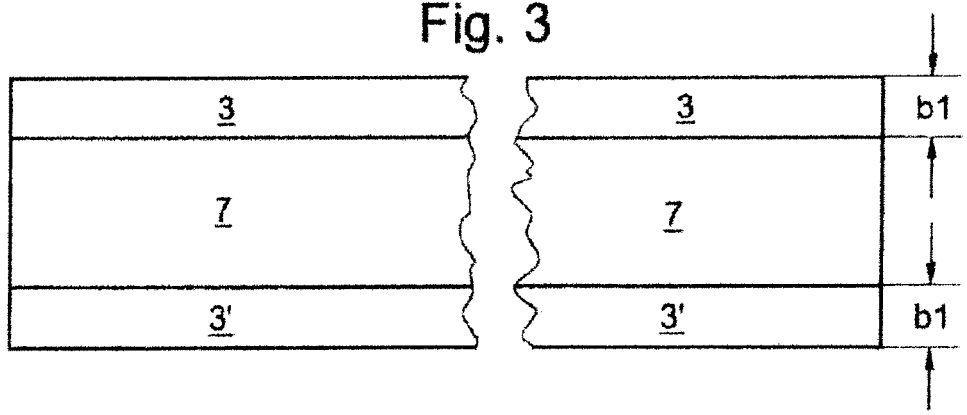
Figure 4:
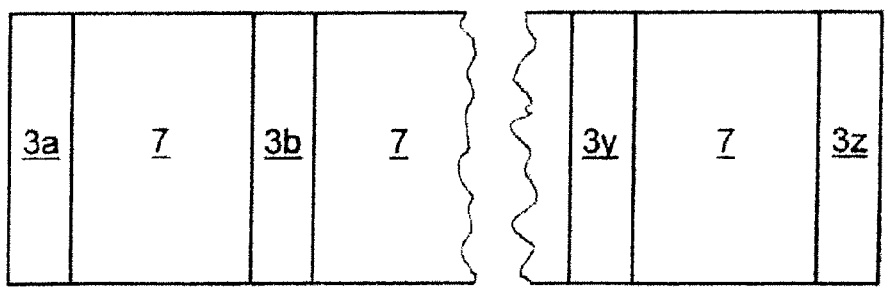
Figure 5:
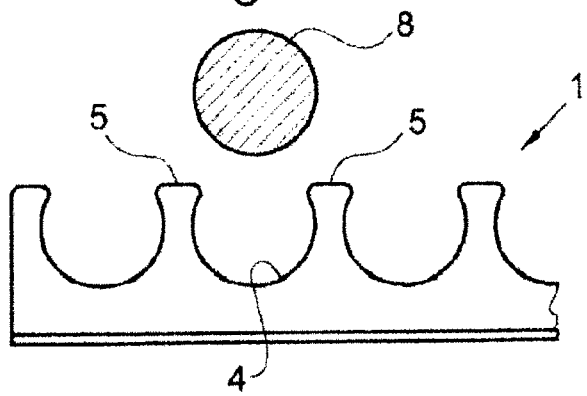
Figure 6:
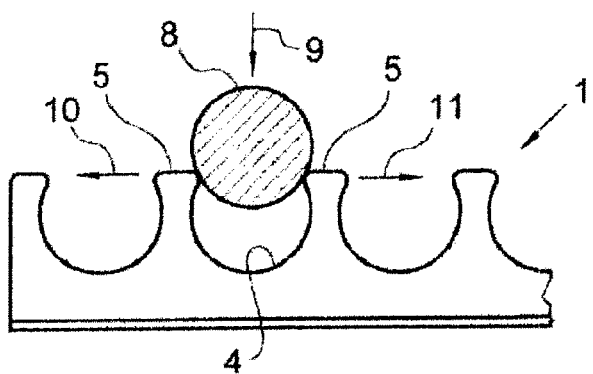
Figure 7:
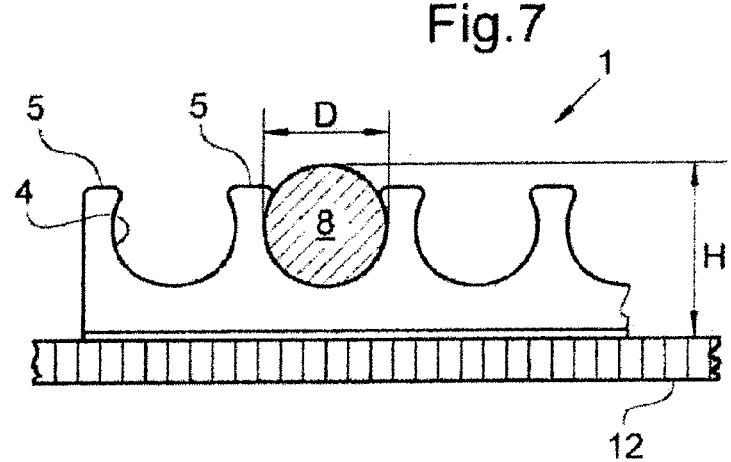
Figure 8:
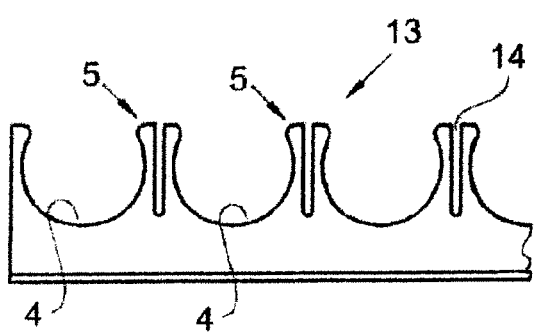
Figure 9:
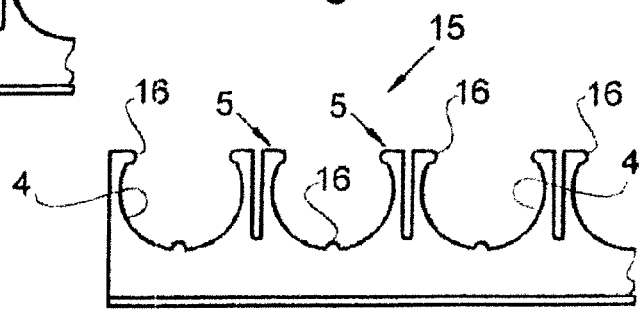

FIG. 1 shows a holder for seatings,
FIG. 2 shows view II of FIG. 1,
FIG. 3 shows view III of FIG. 1,
FIG. 4 shows the holder with adhesive strips extending transversely,
FIG. 5 shows the holder and an optical fibre,
FIG. 6 shows the optical fibre of FIG. 4 in the starting position,
FIG. 7 shows the optical fibre of FIG. 5 in the ending position,
FIG. 8 shows a holder with slotted fins, and
FIG. 9 shows a holder with 3-point seatings.

FIGS. 1 and 2 show a holder 1 for fixing a plurality of optical fibres to a cabin structural part in an aircraft. Holder 1 includes a comb element 2 having length 1 and width b, and double-sided adhesives strips 3, 3' having thickness d. Comb element 2 has an elongated shape and in profile, FIG. 1, shows a plurality of seatings 4 extending transversely to the longitudinal direction thereof, each of which being separated from the others by corresponding fins 5. Seatings 4 are accessible via openings 6 and open out towards the bottom in a form matching the shape of the optical fibre to be inserted. Specifically, each seating 4 has the shape of a horizontal hollow cylinder with diameter D, wherein a part of the surface of the cylinder is removed in the area of opening 6 to allow an optical fibre to be inserted therein. The edges of the openings 6 are each provided with a chamfer r to prevent the optical fibres from being damaged. Comb element 2 is made from a suitable thermoplastic plastic, for example polyamide PA or polyether-ether-ketone PEEK, in an injection moulding process.

FIG. 3 shows view III from FIG. 1 of base surface 7 of comb element 2, with double-sided adhesive strips 3 and 3' having width b1, which are attached adhesively along the lengthwise edges of base surface 7 of comb element 2. The active adhesive surfaces of double-sided adhesive strips 3, 3' are covered with protective films until the final installation of holder 1. The part of the base surface 7 of comb element 2 that is not covered by adhesive strips 3, 3' is indicated with the number 7. It must be ensured that a sufficiently large portion of base surface 7 is not covered by adhesive strips 3, 3'. When holder 1 is attached to a cabin structural part—not shown here—with the aid of the two adhesive strips 3, 3', a cavity having thickness d of the adhesive strips 3, 3' is formed between the cabin structural part and surface 7.

Holder 1 is installed in the following steps.

1. Clean surface 7,
2. Clean the matching surface of the cabin structural part,
3. Remove the protective films from the double-sided adhesive strips 3, 3',
4. Apply and press holder 1 in the installation position, and
5. Inject a curable adhesive into the existing cavity.

Because of the properties of the double-sided adhesive strips, holder 1 may be exposed to loads immediately following installation. When an adhesive that cures at room temperature is used, it will begin curing as soon as it is injected and while other work is carried out on the cabin structural part in question. This eliminates curing processes that consume excessive time and energy.

When locating double-sided adhesive strips 3, 3' as shown in FIG. 3, a relatively long channel is formed in the longitudinal direction, depending on the dimensions of comb element 2, and this must be filled with injected adhesive. This may cause difficulties if the adhesive is too viscous. One possible way to make it easier to inject the adhesive in this case is to use thicker adhesive strips. It is also conceivable to position the adhesive strips 3, 3' transversely to comb element 2 with corresponding spaces between them, to make injection easier.

FIG. 4 shows a view complementing FIG. 3 with double-sided adhesive strips 3a to 3z extending transversely to the longitudinal direction. In this case too, the zones of the base surface that are not covered with adhesive strips are designated with the number 7.

The elongated shape of the holder is due to the fact that it has a relatively large number of seatings 4. The maximum number of seatings usable for each seating is about 120. In order to adapt the holders to the requirements of their respective applications, it is conceivable to produce the holders in different sizes depending on the number of seatings 4 that are necessary. Another option would be to supply them in lengths, for example, so that they may be cut to size on site.

The following FIGS. 5 to 7 show the individual phases of inserting an optical fibre 8 in a seating 4.

As shown in FIG. 5, optical fibre 8 is still located outside seating 4 with lateral fins 5.

In FIG. 6, optical fibre 8 is just touching the chamfered edges of fins 5. In this position, optical fibre 8 may only be pressed into seating 4 by applying force in the direction of arrow 9. When such force is applied, the affected fins 5 yield elastically in the direction of arrows 10 and 11 until optical fibre 8 is seated in seating 4. Optical fibre 8 may be removed from seating 4 again by applying force in the opposite direction. In this way, a detachable connection is established between optical fibre 8 and holder 1.

FIG. 7 shows optical fibre 8 in the engaged position together with a cabin structural part 12. In the engaged position, fins 5 have returned to their original position due to the effect of their elastic restoring forces. The dimensions of seatings 4 are chosen such that a friction fit is created between optical fibre 8 and seating 4 in the installed position, so that optical fibre 8 is also secured in its longitudinal direction. The flat shape of the holder according to the embodiment is obtained by comparing height H with diameter D of the optical fibre. On the basis of the figure, it may be estimated that the dimension of height dimension H is less than 1.5 times the dimension of diameter D of optical fibre 8.

FIG. 8 shows a holder 13. In this embodiment each of the fins 5 of seatings 4 is furnished with a slot 14. This slotted form of fins 5 renders fins 5 more flexible when the optical fibres are pressed into the seatings.

FIG. 9 shows a holder 15 with seatings 4 and fins 5, wherein seatings 4 are each furnished with three protrusions 16. Protrusions 16 extend along the axis of the respective seating and are arranged in the middle of the respective seating 4 and at the ends of fins 5. In this way, a 3-point locating arrangement is created, so that the optical fibre inserted in this seating assumes a defined position.

The advantage of this is that the adhesive connections between the holder and the adhesive component combine the immediate loading capability of a pressure-sensitive bond with the ageing resistance of a reactive adhesive.

The flat shape of holders 1, 13 is also advantageous. As a result of this, it is possible to route the optical fibres correctly on the back of cabin structural parts even in the tightest of spaces.

The invention claimed is:

1. A holder for a plurality of optical fibres having a detachable connection between the holder attached to a cabin structural part of an aircraft and the optical fibres through elastic engagement in a seating, wherein the holder comprises a comb element with a receiving side facing the optical fibres and a base surface facing the cabin structural part, the comb element has an elongated shape with a plurality of seatings that are arranged on the receiving side and extending transversely to the longitudinal direction thereof, and are separated from each other by fins, and the base surface of the holder is partly covered with double-sided adhesive strips having a thickness d, so that at least one cavity having thickness d is formed between the base surface and the cabin structural part, wherein a first connection between the holder and the cabin structural part is created by the double-sided adhesive strips and a second connection between the holder and the cabin structural part is created by a curable adhesive in the cavity having thickness d.

2. The holder as recited in claim 1,
characterised in that
the double-sided adhesive strips are attached adhesively along the longitudinal edges of the base surface of the comb element.

3. The holder as recited in claim 1,
characterised in that
the double-sided adhesive strips are attached adhesively transversely to the comb element on the base surface thereof.

4. The holder as recited in claim 1,
characterised in that
the seatings are cylindrical in shape.

5. The holder as recited in claim 1,
characterised in that
the fins of the seatings are furnished with slots.

6. The holder as recited in claim 1,
characterised in that
the seatings are constructed as 3-point seatings.

* * * * *

UNITED STATES PATENT AND TRADEMARK OFFICE
CERTIFICATE OF CORRECTION

PATENT NO. : 7,394,963 B2
APPLICATION NO. : 11/780657
DATED : July 1, 2008
INVENTOR(S) : Hartlef Page 1 of 1

It is certified that error appears in the above-identified patent and that said Letters Patent is hereby corrected as shown below:

On the title page insert item (30),

--Foreign Application Priority Data

July 25, 2006      (DE)     ……………………….. 102006034236.5--.

On Page 1, in column 2, Abstract, line 3, after "seating", insert --.--.

Signed and Sealed this

Sixth Day of January, 2009

JON W. DUDAS
*Director of the United States Patent and Trademark Office*